United States Patent [19]

Husted

[11] E Re. 29,657

[45] Reissued June 6, 1978

[54] POWER DRIVEN SKI

[75] Inventor: Royce H. Husted, Wheaton, Ill.

[73] Assignee: Saroy Engineering, Wheaton, Ill.

[21] Appl. No.: 746,821

[22] Filed: Dec. 1, 1976

Related U.S. Patent Documents

Reissue of:

[64] Patent No.: 3,853,192
Issued: Dec. 10, 1974
Appl. No.: 404,411
Filed: Oct. 9, 1973

[51] Int. Cl.[2] ..... B62M 27/00

[52] U.S. Cl. ..... 180/5 R; 280/11.11 E

[58] Field of Search ..... 180/5 R; 280/11.11 E

[56] References Cited

U.S. PATENT DOCUMENTS

| | | | |
|---|---|---|---|
| 2,393,309 | 1/1946 | Cochran | 180/5 R |
| 2,625,229 | 1/1953 | Van Voorhees | 180/5 R |
| 2,706,528 | 4/1955 | Kallio | 180/5 R |
| 2,857,008 | 10/1958 | Pirrello | 280/11.11 E |
| 3,146,840 | 9/1964 | Walsh | 180/5 R |
| 3,221,830 | 12/1965 | Walsh | 180/5 R |
| 3,252,533 | 5/1966 | Aeder | 180/9.24 R |
| 3,645,348 | 2/1972 | Thompson | 180/5 R |
| 3,710,881 | 1/1973 | Thompson | 180/5 R |

FOREIGN PATENT DOCUMENTS

| | | | |
|---|---|---|---|
| 530,131 | 9/1921 | France | 280/11.11 E |

*Primary Examiner*—Philip Goodman
*Attorney, Agent, or Firm*—Samuel Shiber

[57] ABSTRACT

A power driven ski is divided by an aperture into anterior and posterior ski portions, which are held one to the other by a bridge so that their combined undersurfaces form a longitudinally smooth skiing undersurface throughout the length of the ski. A motor driven endless tread is circulateably supported around the posterior ski portion for thrusting against the snow over which the posterior ski portion slides.

9 Claims, 7 Drawing Figures

POWER DRIVEN SKI

Matter enclosed in heavy brackets [ ] appears in the original patent but forms no part of this reissue specification; matter printed in italics indicates the additions made by reissue.

BACKGROUND OF DISCLOSURE

This invention relates to skis, and specifically to a ski having power driven means for propelling a skier.

Presently there is a polarization between outdoor winter sport enthusiasts. The purists adhere to skis propelled by gravity, while the modernists enjoy the control of motor power together with the winter outdoors environment by mounting a snowmobile.

A power driven ski, as explained in Richard F. Thompson U.S. Pat. Nos. 3,645,348 and 3,710,881 (of which I am an assignee) which are herein incorporated by a reference, provides the skier on the one hand with some of the challenges of downhill skiing such as holding balance, steering and braking by body manipulation, etc., without being limited to a "one-way" skiing on an often-crowded hill equipped with a ski lift. On the other hand, a power driven ski is much less cumbersome to use, transport and store than a snowmobile, less expensive to produce and maintain, and provides a more exciting form of sport since it requires the skier's body participation and skill to a degree not experienced while driving a snowmobile or other motorized vehicle.

Thus, a power driven ski opens to the skier the entire snow covered outdoors, and specifically the flat northern regions of the United States such as the Midwest region, to scout and enjoy in a new and exciting way.

SUMMARY OF DISCLOSURE

Briefly, a power driven ski is provided by combining an anterior ski portion with a traction unit comprising a posterior ski portion and a power driven endless tread circulateably supported thereon. It is important to combine the anterior ski portion with a traction unit having certain features (which will be discussed herein shortly) so that the resulting power driven ski as a whole will achieve the object of the present invention which is:

To provide the skier with a unit that is worn on the foot and functions on the snow as a conventional ski, having a longitudinally smooth undersurface substantially throughout its length as a conventional ski, for enabling the experienced skier to execute the full range of skiing maneuvers from straight line skiing, snow plowing and edging to christie and stem turns) while giving the skier, at the same time, the freedom to ski on flat and hilly terrain (uphill or downhill) at a speed and direction of his choice.

The features which are required of the traction unit, in addition to its ability to propell the skis and skier in order for the ski as a whole to achieve the above object, are as follows:

- to have a longitudinally smooth snow contacting, stationary undersurface throughout its length,
- to generate a minimal lateral reaction from the snow with the tread even when sliding laterally,
- to laterally support and shelter the tread so it is both functional and undisturbed by such lateral movement of the ski relative to the snow, (such lateral movement occurs extensively during turning and braking maneuvers),
- to offer minimal resistance to powerless coasting or downhill skiing, and to be light and compact.

These and other features of the invention will be further discussed and illustrated with reference to the Figures in the following paragraphs.

DETAILED DESCRIPTION OF THE FIGURES

Figures 1, 2, 3, 4, 5, 6, 7:
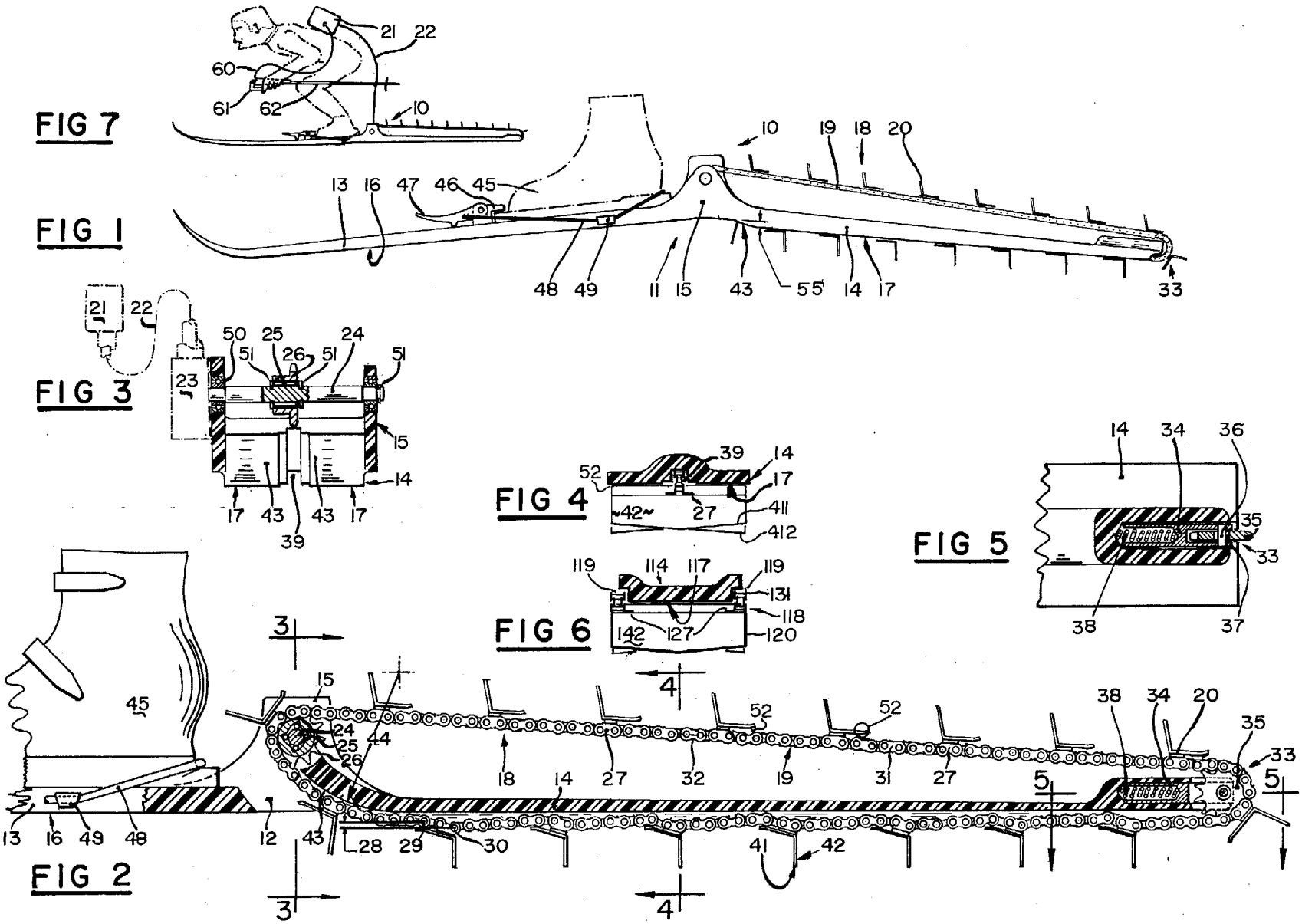
FIG. 1 is a general side-view of a preferred embodiment of a power driven ski in its free position.
FIG. 2 is a sectional side-view of a posterior portion of the power driven ski shown in FIG. 1.
FIG. 3 is a sectional view of the power driven ski taken along the line 3—3 marked on FIG. 2, with the tread removed.
FIG. 4 is a sectional view of the power driven ski taken along the line 4—4 marked on FIG. 2.
FIG. 5 is a sectional view of the power driven ski taken along the line 5—5 marked on FIG. 2, with the tread removed.
FIG. 6 is a sectional view of a modified embodiment of a power driven ski taken on a plane which is orientated relative to the modified embodiment as the plane of FIG. 4 is oriented relative to the preferred embodiment.
FIG. 7 is a general side view of a power driven ski in use.

A preferred embodiment of a power driven ski 10 (shown in FIGS. 1 to 5) comprises:

A ski 11 having an aperture 12 which divides it to anterior and posterior ski portions 13 and 14, respectively, which are held (and positioned) one to the other by a bridge 15, so that the longitudinally smooth anterior and posterior undersurfaces 16 and 17, respectively, unite to jointly form a longitudinally smooth snow contacting, stationary (relative to the ski, as in a conventional ski) skiing undersurface substantially (that is, neglecting the relatively small gap in the area of the aperture) throughout the length of the ski.

Conventional binding means which are located at the rear part of the anterior ski portion having, a front anchor 46, rear anchors 49 (one shown), a lever 47 and a cable 48 are provided for attaching the ski 11 to a skier's foot through a boot 45.

An endless tread 18 having at least one tension carrying member 19 in the form of a roller chain containing attachment links to which outwardly protruding cleats 20 are attached for thrusting against snow pre-packed by the anterior undersurface 16 and on which the posterior undersurface 17 slidingly bears and thereby maintains packed, circulateably supported around the posterior ski portion 14.

Means for circulateably supporting the tread 18 consisting of; a drive sprocket 26 coupled to a shaft 24 which is in turn being rotateably supported by the bridge 15 through ball-bearings 50, which are affixed to the shaft with a snap ring 51, and an idler assembly 33 having a sprocket 35 which is rotateably supported through a needle-bearing 37 and a shaft 36 on a piston 34 which is slideably disposed in a bore at the rearend of the posterior ski portion 14.

Motor means 21 which incorporate a centrifugal clutch and which is adapted to be carried by the skier on his back or hip area is coupled to the tread 18 through a flexible shaft 22 and a right angle gear box 23 for circulating the tread 18. Optionally the motor 21 can be mounted directly on the bridge 15 in which case a chain and sprockets drive may replace the flexible shaft 22 and the gear box 23.

A one-way clutch 25 formed in the hub of the sprocket 26 couples it to the shaft 24 and permits the free circulation of the tread 18 during powerless coasting or downhill skiing. Further, the one-way clutch 25 prevents the motor 21 from braking the tread and throwing the skier off balance forwardly when the motor 21 suddenly slows down due to some malfunction or due to a sudden release of the motor's throttle which is normally controlled through an assembly comprising a trigger mechanism 61 attached to one of the ski poles 62 which is connected to the motor 21 through a flexible cable 60 by the skier's hand (note FIG. 7).

The engagement of the one cleat 20 with snow near the front of the posterior undersurface 17 is sequenced out of phase with the disengagement of another one of the blades 20 near the rear of the posterior undersurface 17 to prevent the torque peaks that the engagement and disengagement imposes on the motor 21 through the shaft 22 from accumulating at one point in time.

The tread 18 circulates from above to below the posterior ski portion through the aperture 12, over the front sprocket 26 which has a first pitch-line radius, and thereafter over an arched ramp 43 having a substantially larger pitch-line radius 44 (although not necessarily a constant radius) for guiding the cleats in a downwardly direction on an arc into a gradual engagement with the snow. The reason for the arched ramp feature can be best understood by looking at the process by which the cleat engages the snow.

The snow which is exposed to the cleat through the aperture has been pre-packed by the passage of the anterior undersurface 17 over it, and often, due to common weather processes, it is covered by an icy crust. As the tread 18 circulates over the sprocket 26, its various portions assume a speed which is proportional to the radius along which they swing. For example, if a tip 41 of the cleat 20 swings on a radius which equals twice the pitch-line radius of the sprocket 26, its speed will double relative to the speed of the chain 19 (which is also the speed that the cleats 20 and their tip 41 assume as they sweep along the straight part of the posterior undersurface 17). In addition, as simple geometrical considerations would indicate, if the cleat will become engaged with the snow while it is still passing over the sprocket 26, then its generous frontal area 42 will be forced into the snow rather than its sharp tip 41. Such a process of engaging the cleat 20 with the snow by forcing its frontal area 42 into it while the cleat 20 moves momentarily at an increased speed (i.e., reduced leverage) imposes a torque peak on the motor 21. This torque peak represents a power loss and gives start-ups from standing still an erratic "stick-slip" characteristic.

One remedy to correct the above mentioned problem would be to substantially increase the front sprocket's diameter, but this would have several obvious drawbacks such as making the power driven ski much more cumbersome and heavy, especially in cases where the engine is mounted directly on the bridge 15 above the sprocket 26 (as one may optionally mount the engine). Further, a power driven ski with a large drive sprocket would tend to translate flexing of the posterior ski portion 14 into a substantial change in the length of the chain 19 on one hand, and cause artificial flexing of the posterior ski portion 14 on the other hand. Thus, substantial enlargement of the sprocket 26 would negatively change the characteristics of the power driven ski.

In order to obtain the improvement that a large sprocket would offer to the engagement process while avoiding its above discussed structural penalties, a combination of a small sprocket 26 followed by an arched ramp 43 is employed. With this arrangement, the cleat 20 accomplishes the majority of the turnover on the front sprocket, but as the cleat 20 starts to effectively engage the snow it becomes guided along the arched contour of the ramp 43 over which the cleats' turning process becomes slower. Thus, during the critical cleat 20-snow engagement stage, the cleat 20 moves as if it were turning over a larger sprocket than the sprocket 26 actually is (It should be noted that the arched ramp 43 structure is used in this invention to smoothen out the engagement process of the protruding cleats 20, and not for obstacle negotiating. To negotiate obstacles, the power driven ski employs a curved portion at its very front section, as in regular skis and other tracked and gliding vehicles).

To further refine the graduality of the cleats' engagement with the snow, their tip can be shaped to avoid a line contact with the snow surface, but to replace it with a point or points contact by shaping the cleats' tip to form a line which is not parallel to the posterior undersurface 17, as shown in FIG. 4, where the Cleat's tip 411 has a flat v shape and the next cleat behind it has a tip 412 with an inverted v shape.

It should be pointed out that during the disengagement process, similar geometrical considerations that were discussed above would make a large rear sprocket, or a combination of a second arched ramp ahead of the rear sprocket 35, useful. However, disengaging from the snow is a process which offers less resistance than the engagement process during which further packing of packed snow downwards occurs. Also, the chain 19 carries maximum tension forces as it passes over the rear sprocket 35, while it carries minimal tension forces when passing over the arched ramp 43. Thus, the frictional forces between the rear arched ramp would be several times higher than they are over the front arched ramp 43. Therefore, while its a designer's option to incorporate a rear arched ramp, it is pointed out that the ratio between improvement in performance to the structural and power loss penalties that a rear ramp structure represents is less favorable in the case of the rear arched ramp versus a front one.

As explained in Thompson's U.S. Pat. No. 3,710,881 (which was previously incorporated by reference) it is important to effectively energize the posterior ski portion against the snow in order to prevent the snow from being blown away and to obtain forward thrust from the snow. For this purpose, a dihedral angle of less than 180° between the anterior and posterior ski portions is called for by Thompson. In the present invention, as shown in FIG. 1, the posterior ski portion undersurface 17 can be stepped (lowered) downwards relative to the anterior ski portion undersurface 16, forming a step which is indicated by numeral 55, to improve the above mentioned energization of the undersurface 17 against the snow. This optional modification can be used together with, or without, Thompson's dihedral angle of less than 180°.

As the cleats 20 engage the snow they erect into it on their rear tip which is bent to form a sliding bearing 52 throughout the width of the cleat thereby causing the chain to assume a zig-zag configuration as viewed on a plane which is parallel to the chain 19 and perpendicular to the posterior undersurface 17 (note FIG. 2). This zig-zag configuration causes tension forces which are carried by the chain 19 to negate bending moments imposed on it by the cleats 20 through connecting links 27 by offering the tension forces a lever arm 28 (which is slightly smaller than the vertical distance between the axes of chain hinge pins 29 and 30) to act on.

At the rear-end of the posterior ski portions, the idler assembly 33 is resiliently floating on a helical compression spring 38 and thereby permits the chain 19 to assume the above discussed zig-zag configuration without becoming stretched.

The chain 19 comprises a series of links (standard links 31, attachment links 27, and a lock link 32) hinged one to the next by hinge pins 29 and 30 which permit the pivoting of the chain as viewed on a plane which is parallel to the chain 19 and perpendicular to the posterior undersurface 17 enabling the chain to pass over the sprockets 26 and 35 and over the arched ramp 43, but this hinging arrangement does resist pivoting of a link relative to the next as viewed on a plane parallel to the posterior undersurface 17 which prevents twisting of the cleats (around an axis passing through the attachment link 27 and perpendicular to the posterior undersurface 17) due to asymetrical loading of the cleat.

The chain 19 is longitudinally guided by a channel 39 while passing under the posterior ski portion 14. The channel 39 is formed in the posterior undersurface 17 for guiding the chain 19 between the sprockets 29 and 35, for sheltering the chain from lateral movement between the ski 11 and the snow which occurs extensively during turning and braking maneuvers, and for supporting the chain (slightly ahead and slightly behind the attachment link 27 on alternating sides) when the chain resists the previously discussed tendency of the cleats to twist due to asymetrical loading and tries to cause the chain to assume a zig-zag configuration as viewed on a plane which is parallel to the posterior undersurface 17.

A general view of a power driven ski 10 is shown in FIG. 7. It should be noted that in order to maximize traction capability a skier may wear a pair of power driven skis, however, a combination of a power driven ski on one foot and a conventional ski on the other foot provides adequate traction for negotiating a wide range of topographical and snow conditions, and since this combination is substantially simpler in terms of hardware, it is deemed a preferred arrangement at least for leisure type usage of the power driven ski. Further, by favoring the foot wearing the power driven ski in distributing his body's weight, the skier can overcome spots where increased traction is required, such as when starting from stand still on a steep hill, etc. It may be further noted that as soon as the skier gathers speed the skis glide on the snow with minimal resistance.

A modified embodiment of the present invention (shown in FIG. 6) where an endless tread 118 has two tension carrying members in the form of chains 119 which contain attachment links 127. The chains move adjacent to and obtain longitudinal guidance and sheltering from the sides of the posterior ski portion 114. The tread 118 tends to be heavier and more expensive to fabricate than the tread 18 of the preferred embodiment, however, it negates twisting of the cleats 120 around a vertical axis effectively with its tension carrying capacity. Therefore, the modified embodiment should be given consideration for certain applications in which the cleats' frontal area 142 is being repeatedly subjected to asymetrical loading. It should be noted that the traction unit of the modified embodiment has a longitudinally smooth undersurface 117 (which is an essential prerequisite of any traction unit that is to be used in a power driven ski according to the present invention).

It is obvious that modifications and substitutions can be made in the power driven ski without departing from the spirit and the scope of my invention.

I claim:

1. In a power driven ski for [attachment to a skier's foot and for] slidingly negotiating snow as with a conventional ski, said power driven ski having in combination;

a. a ski with an aperture dividing it into an anterior ski portion having a longitudinally smooth anterior undersurface and a posterior ski portion, b. a bridge holding said ski portions to each other,

[c. means for attaching said ski to a skier's foot,]

[d.] *c.* an endless tread circulateably supported around said posterior ski portion having at least one tension carrying member and a plurality of cleats attached to said tension carrying member for thrusting against the snow.

[e.] *d.* means for circulateably supporting said tread around said posterior ski portion, and

[f.] *e.* motor means coupled to said tread for circulating said tread around said posterior ski portion, the improvement wherein the posterior ski portion has a longitudinally smooth, snow contacting stationary undersurface and said bridge holds said ski portions in position one relative to the other so that said undersurfaces jointly form a longitudinally smooth skiing undersurface substantially throughout the length of said ski.

2. A power driven ski as in claim 1 including a one way clutch coupling said motor means to said tread.

3. A power driven ski as in claim 1 wherein the engagement of one of said blades with snow near the front of said posterior undersurface is sequenced out of phase with the disengagement of another one of said blades from snow near the rear of said posterior undersurface.

4. A power driven ski as in claim 1 wherein said tread blades are outwardly protruding, and the tread circulates from above to below said posterior ski portion through said aperture, over a front sprocket having a first pitch-line radius and therafter over an arched ramp having a substantially larger pitch-line radius, said arched ramp being adapted to guide said cleats downwardly on an arc into gradual engagement with snow.

5. A power driven ski as in claim 1 wherein said posterior undersurface is stepped downwards relative to said anterior undersurface.

6. A power driven ski as in claim 1 wherein said blades are outwardly protruding and are adapted to erect into the snow on a bearing formed at their rear tip while engaging the snow and thereby cause said tension carrying member to assume a zig-zag configuration as viewed on a plane which is parallel to the chain and perpendicular to said posterior undersurface, said zig-zag configuration causing tension forces carried by said tension carrying member to negate bending moments imposed on it by said blades which are attached to it.

7. A power driven ski as in claim 6 wherein said tension carrying member is circulatebly supported on a drive sprocket which is coupled to said motor means, and on a rear sprocket which is mounted on said posterior ski portion by resilient means which permit said tension carrying member to assume said zig-zag configuration without becoming stretched.

8. A power driven ski as in claim 6 wherein said tension carrying member comprises a chain of links hinged one to the next to permit said links to pivot one relative to the next as viewed on a plane which is parallel to said chain and is perpendicular to said posterior undersurface, but resist such pivoting as viewed on a plane which is parallel to said posterior undersurface.

9. A power driven ski as in claim 8 wherein the part of said tension carrying member which is under said ski is longitudinally guided in a channel in said posterior undersurface to thereby shelter said tension carrying member from lateral movement between the ski and snow as well as for supporting the tread in its resistance to assume a zig-zag configuration on a plane that is parallel to said posterior undersurface due to asymetrical loading of the blades.

* * * * *